United States Patent
Hill

(10) Patent No.: US 12,084,095 B2
(45) Date of Patent: Sep. 10, 2024

(54) MANWAY RELIEF FOR A TANK CAR

(71) Applicant: Trinity Tank Car, Inc., Dallas, TX (US)

(72) Inventor: Ross E. Hill, River Oaks, TX (US)

(73) Assignee: TRINITY TANK CAR, INC., Dallas, TX (US)

( * ) Notice: Subject to any disclaimer, the term of this patent is extended or adjusted under 35 U.S.C. 154(b) by 842 days.

(21) Appl. No.: 17/150,353

(22) Filed: Jan. 15, 2021

(65) Prior Publication Data

US 2021/0221409 A1 Jul. 22, 2021

Related U.S. Application Data

(60) Provisional application No. 62/962,662, filed on Jan. 17, 2020.

(51) Int. Cl.
*B61D 5/00* (2006.01)
*B61D 5/02* (2006.01)
(Continued)

(52) U.S. Cl.
CPC .............. *B61D 5/04* (2013.01); *B61D 5/004* (2013.01); *B61D 5/02* (2013.01); *B61D 5/08* (2013.01);
(Continued)

(58) Field of Classification Search
CPC . B61D 5/04; B61D 5/08; B61D 5/004; B61D 5/02; B61D 17/16; F17C 3/02;
(Continued)

(56) References Cited

U.S. PATENT DOCUMENTS 2,239,511 A * 4/1941 West ..................... B61D 17/16
105/377.07
2,587,204 A * 2/1952 Patch, Jr. ................. B61D 5/04
220/592.27
(Continued)

FOREIGN PATENT DOCUMENTS

CN 106494423 A * 3/2017 ............... B61D 5/00
EP 3346178 A1 * 7/2018 ............... F17C 1/00

OTHER PUBLICATIONS

Canadian Patent Office, Official Action in CA Application No. 3,105,841, dated Mar. 12, 2024.

*Primary Examiner* — Zachary L Kuhfuss
*Assistant Examiner* — James William Jones
(74) *Attorney, Agent, or Firm* — Baker Botts L.L.P.

(57) ABSTRACT

A cryogenic tank car tank includes an outer tank, an inner tank positioned within the outer tank, an inner nozzle, and inner manway plate, an outer nozzle, and an outer manway plate. The inner nozzle defines an opening in the inner tank. The inner manway plate is welded to the inner nozzle and covers the opening in the inner tank. The outer nozzle defines an opening in the outer tank and is positioned above the inner nozzle, such that the inner manway plate is accessible through the outer nozzle. The outer manway plate couples to an upper edge of the outer nozzle to cover the opening in the outer tank. In response to applying the vacuum to the annular space between the inner and outer tanks, a differential pressure between the annular space and a space external to the outer tank secures the outer manway plate to the outer nozzle.

20 Claims, 4 Drawing Sheets

(51) Int. Cl.
  *B65D 88/74* (2006.01)
  *B65D 90/00* (2006.01)
  *B65D 90/10* (2006.01)
  *F16J 13/00* (2006.01)
  *F22B 37/22* (2006.01)
  *B60J 10/27* (2016.01)
  *B61D 17/16* (2006.01)
  *B65D 45/00* (2006.01)
  *F17C 3/02* (2006.01)
  *F17C 3/08* (2006.01)

(52) U.S. Cl.
  CPC ............. *B65D 90/10* (2013.01); *F16J 13/00* (2013.01); *F22B 37/221* (2013.01); *B60J 10/27* (2016.02); *B61D 17/16* (2013.01); *B65D 45/00* (2013.01); *F17C 3/02* (2013.01); *F17C 3/08* (2013.01)

(58) Field of Classification Search
  CPC .. F17C 3/08; Y02E 60/32; B60J 10/27; B65D 90/10; B65D 90/54; B65D 45/00; F16J 13/00; F16J 15/32; F16J 15/3204; F22B 37/221
  USPC ............................. 105/357, 358, 360, 377.08
  See application file for complete search history.

(56) References Cited

U.S. PATENT DOCUMENTS

| | | | | |
|---|---|---|---|---|
| 2,896,811 A * | 7/1959 | Blaser | F22G 3/009 | 220/678 |
| 3,078,004 A * | 2/1963 | Randolph | B61D 5/008 | 280/832 |
| 3,090,519 A * | 5/1963 | Koranda | B65D 90/545 | 220/323 |
| 3,328,496 A * | 6/1967 | Graves | B61D 5/04 | 528/84 |
| 3,370,741 A * | 2/1968 | Worthen | F28D 7/06 | 220/817 |
| 4,542,545 A * | 9/1985 | Johnson | A47K 3/006 | 4/557 |
| 4,805,540 A * | 2/1989 | Mundloch | B61F 1/02 | 105/362 |
| 5,097,976 A * | 3/1992 | Zink | B61D 5/004 | 220/849 |
| 5,460,285 A * | 10/1995 | Harding, Sr. | B65D 90/34 | 220/366.1 |
| 5,505,327 A * | 4/1996 | Witt | B65D 90/046 | 220/495.06 |
| 5,813,352 A * | 9/1998 | Bramlett | F16J 13/16 | 220/372 |
| 6,047,747 A * | 4/2000 | Bowen | F17C 1/14 | 420/92 |
| 6,053,113 A * | 4/2000 | Shaddle | B60P 3/226 | 105/377.07 |
| 6,296,135 B1 * | 10/2001 | Anderson | B61D 17/16 | 220/203.23 |
| 7,131,455 B2 * | 11/2006 | Horban | F17C 1/00 | 105/358 |
| 7,344,045 B2 * | 3/2008 | Harper | F17C 1/00 | 220/62.18 |
| 2003/0029877 A1 * | 2/2003 | Mathur | F17C 3/08 | 220/592.27 |
| 2008/0307798 A1 * | 12/2008 | Luo | F17C 13/02 | 220/560.12 |
| 2010/0146992 A1 * | 6/2010 | Miller | F17C 3/04 | 62/53.2 |
| 2010/0282124 A1 * | 11/2010 | Blevins, Jr. | B61D 5/08 | 105/377.08 |
| 2011/0107940 A1 * | 5/2011 | Borowski | B61D 5/08 | 277/648 |
| 2013/0049381 A1 * | 2/2013 | Hageman | B61D 5/08 | 292/212 |
| 2015/0083022 A1 * | 3/2015 | Douglas | B61D 5/08 | 105/377.07 |
| 2015/0276133 A1 * | 10/2015 | Ollweiler | F17C 13/00 | 220/560.04 |
| 2015/0291183 A1 * | 10/2015 | Thomas | B61D 5/08 | 105/358 |
| 2015/0329284 A1 * | 11/2015 | Benet | B65D 53/02 | 220/378 |
| 2016/0001935 A1 * | 1/2016 | Smith | B65D 45/305 | 220/327 |
| 2017/0349188 A1 * | 12/2017 | Schmidt | B61D 5/08 | |
| 2018/0273055 A1 * | 9/2018 | Dzolovic | F16J 15/104 | |
| 2019/0316734 A1 * | 10/2019 | Raj | F17C 7/02 | |
| 2023/0043590 A1 * | 2/2023 | Wolf | B65D 81/20 | |

* cited by examiner

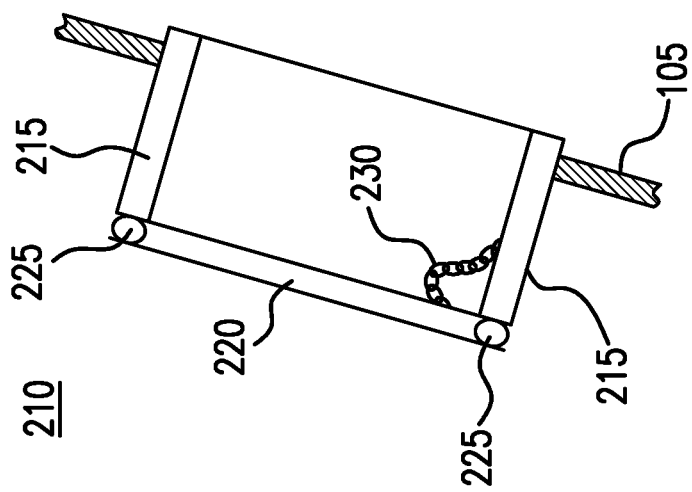
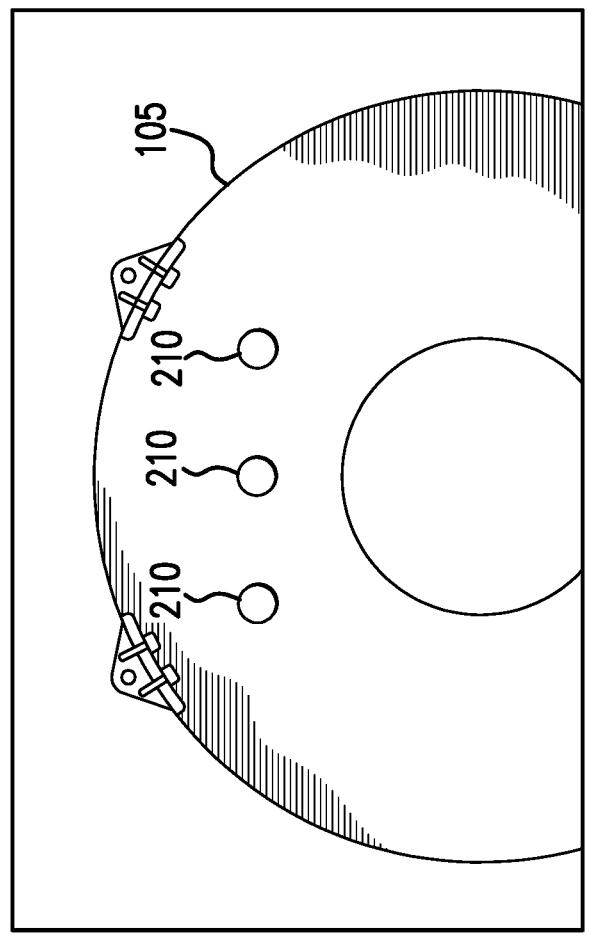

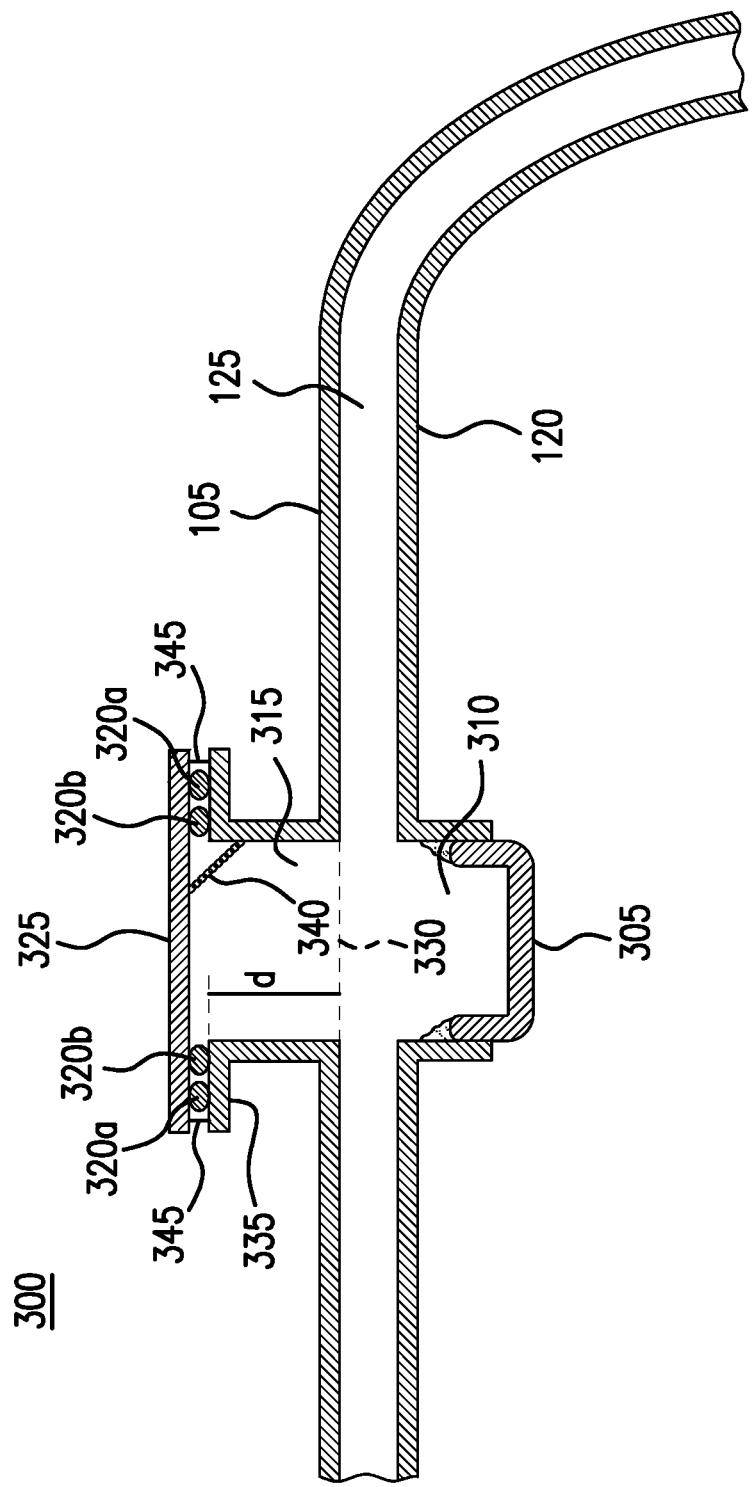

MANWAY RELIEF FOR A TANK CAR

RELATED APPLICATIONS

This application claims priority to U.S. Provisional Application Ser. No. 62/962,662 entitled "MANWAY RELIEF FOR A TANK CAR," filed Jan. 17, 2020, the entire content of which is incorporated herein by reference.

TECHNICAL FIELD OF THE INVENTION

This disclosure relates generally to railcars, and more particularly to a manway relief for a cryogenic tank car constructed using a tank within a tank design.

BACKGROUND

Railroad tank cars are used to transport a variety of fluid commodities over large distances. While traditional tank cars typically include a tank wrapped in insulation and covered in a protective jacket, specialized tank cars also exist. For example, cryogenic tank cars have been designed to transport cryogenic liquids (e.g., liquid nitrogen, liquid hydrogen, liquid oxygen, liquid methane, etc.). Such tank cars typically include an inner tank positioned within an outer tank. A vacuum is applied to the annular space between the two tanks to provide insulation to the commodity transported within the inner tank.

SUMMARY

According to an embodiment, a tank for a cryogenic tank car includes an outer tank, an inner tank positioned within the outer tank, an inner nozzle, and inner manway plate, an outer nozzle, and an outer manway plate. The inner nozzle defines an opening in the inner tank. The inner manway plate covers the opening in the inner tank. The inner manway plate is welded to the inner nozzle. The outer nozzle defines an opening in the outer tank. The outer nozzle is positioned above the inner nozzle, such that the inner manway plate is accessible through the outer nozzle. The outer nozzle extends away from the outer tank and terminates at an upper edge of the outer nozzle. The outer manway plate is configured to couple to the upper edge of the outer nozzle to cover the opening in the outer tank. A space defined by an interior surface of the outer tank and an exterior surface of the inner tank is configured to hold a vacuum. In response to applying the vacuum to the space, a differential pressure between the space defined by the interior surface of the outer tank and the exterior surface of the inner tank and a space external to the outer tank secures the outer manway plate to the outer nozzle.

According to another embodiment, a method of servicing an inner tank of a cryogenic tank car, which includes an outer tank and the inner tank positioned within the outer tank, includes removing a vacuum from a first space defined by an interior surface of the outer tank and an exterior surface of the inner tank. An outer manway plate was secured to an outer nozzle by a differential pressure that was generated by the vacuum between the first space and a space external to the outer tank. The outer nozzle defines an opening in the outer tank. The outer nozzle extends away from the outer tank and terminates at an upper edge of the outer nozzle. In response to removing the vacuum, the method includes removing the outer manway plate from the outer nozzle. The outer nozzle is positioned above an inner nozzle. The inner nozzle defines an opening in the inner tank. An inner manway plate is coupled to the inner nozzle, such that the inner manway plate covers the opening in the inner tank. The method additionally includes accessing the inner manway plate through the outer nozzle. The method also includes removing the inner manway plate from the inner nozzle. The method further includes accessing the inner tank through the inner nozzle.

According to a further embodiment, a cryogenic tank car includes an outer tank, an inner tank positioned within the outer tank, an inner nozzle, an inner manway plate, an outer nozzle, an outer manway plate, and a set of wheel assemblies. The inner nozzle defines an opening in the inner tank. The inner manway plate covers the opening in the inner tank. The inner manway plate is welded to the inner nozzle. The outer nozzle defines an opening in the outer tank. The outer nozzle is positioned above the inner nozzle, such that the inner manway plate is accessible through the outer nozzle. The outer nozzle extends away from the outer tank and terminates at an upper edge of the outer nozzle. The outer manway plate is coupled to the upper edge of the outer nozzle, such that the outer manway plate covers the opening in the outer tank. A space defined by an interior surface of the outer tank and an exterior surface of the inner tank is configured to hold a vacuum. In response to applying the vacuum to the space, a differential pressure between the space defined by the interior surface of the outer tank and the exterior surface of the inner tank and a space external to the outer tank secures the outer manway plate to the outer nozzle. The outer tank is coupled to the set of wheel assemblies.

Certain embodiments of the manway relief may provide one or more technical advantages. For example, an embodiment may allow for a greater amount of excess pressure in the annular space between the inner and outer tanks to vent out of the annular space than in traditional configurations. As another example, an embodiment allows for access to the inner manway of the inner tank without cutting through the outer tank. As a further example, the larger surface area of the manway relief nozzle and plate, as compared with traditional vacuum release nozzles, provides a greater clamping force per inch on the gasket positioned between the manway nozzle and the manway relief plate positioned above the nozzle, thereby providing a better seal for the vacuum. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 2A and 2B illustrate examples of conventional vacuum release nozzles and plates for use with the cryogenic tank car of FIG. 1;

FIG. 3 illustrates an example embodiment of the manway relief of the present disclosure, for use with the cryogenic tank car of FIG. 1.

DETAILED DESCRIPTION

Figure 1:
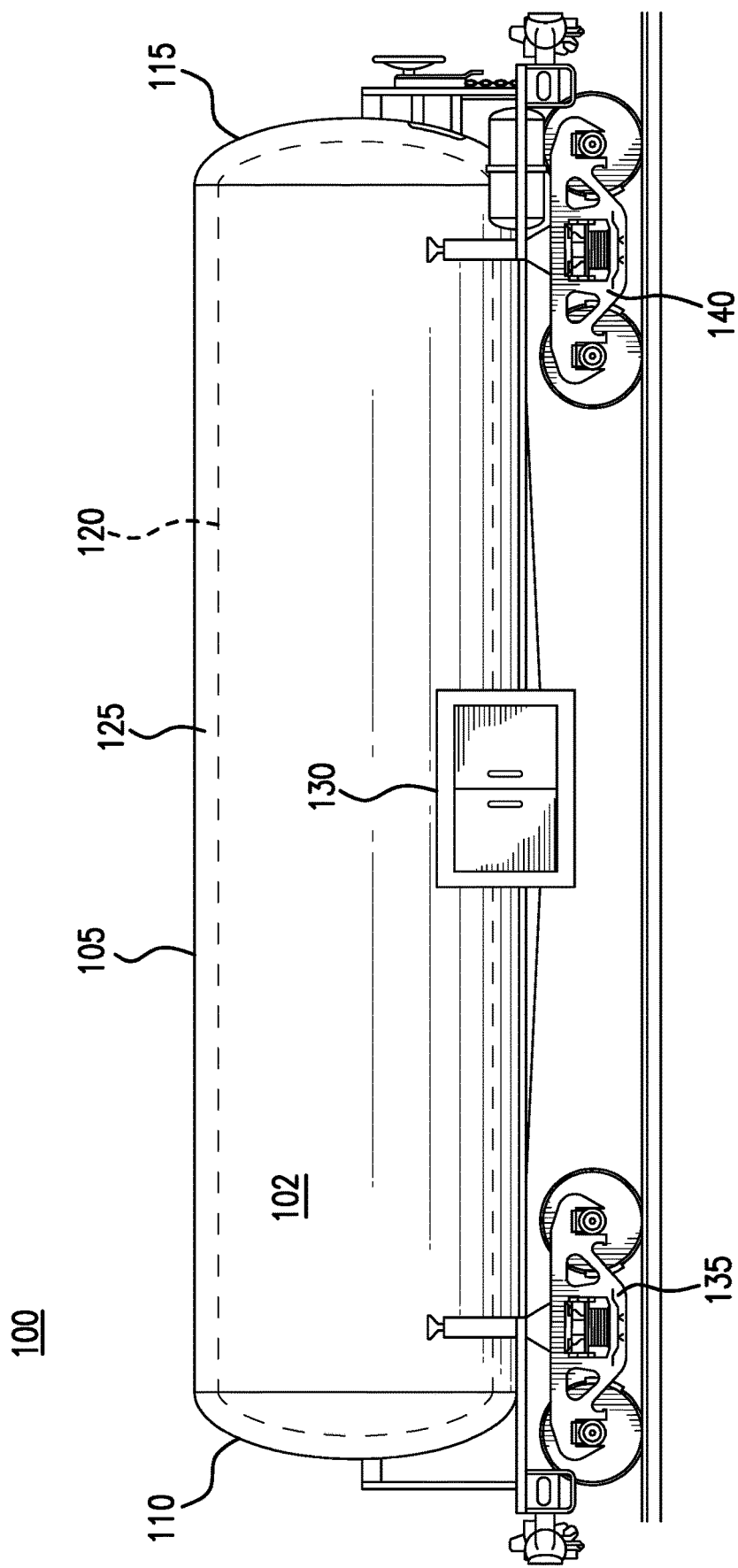
FIG. 1 illustrates an example cryogenic tank car.

Railway tank cars are used to transport a variety of fluid commodities over large distances. Traditional tank cars typically include a metal tank, wrapped in an insulating material, and covered in a protective outer jacket. Such traditional tank cars may be suitable for transporting liquids such as oil or ethanol. However, when the commodity to be transported within the tank car is a cryogenic liquid (e.g., liquid nitrogen, liquid hydrogen, liquid oxygen, liquid methane, etc.), the insulation offered by a traditional car may not be sufficient to maintain the commodity at the low temperatures characteristic of such liquids. Accordingly, cryogenic tank cars have been designed to transport these commodities.

Cryogenic tank cars typically include a thin inner tank positioned within a thicker outer tank. During normal operations, a vacuum applied to the annular space between the two tanks is used to provide a high degree of insulation to the commodity held within the inner tank, enabling the tank car to haul extremely low temperature commodities over large distances, while helping to minimize heat leakage into the inner tank. However, if a tank failure occurs, whereby the vacuum between the inner tank and the outer tank is lost, pressure may build in the annular space between the two tanks. If left unchecked, this pressure (applied to the exterior surface of the inner tank) may cause the inner tank to collapse. Accordingly, conventional cryogenic tank cars typically include a set of vacuum relief assemblies coupled to the outer tank. Such vacuum relief assemblies include vacuum release plates coupled to nozzles extending through the outer tank. Traditional vacuum release plates and nozzles range from four to six inches in diameter and are typically mounted either on the top of the tank car, down the centerline of the car, or near the top of the tank heads at one or both ends of the car. These plates are held in place on the nozzles by the differential pressure between the external environment and the annular space between the inner and outer tanks, in which vacuum has been applied. Accordingly, a loss of vacuum within the annular space causes the plates to fall off, thereby preventing any build-up of pressure between the inner and outer tanks.

In a conventional cryogenic tank car, the nozzles of the vacuum relief assemblies provide the only direct access to the space between the inner tank and the outer tank. However, due to the small size of the nozzles, such access is of limited use. For example, if railway employees wish to service the inside of the inner tank, they must first cut out a large enough hole in the outer tank through which they may then access the inner manway of the inner tank.

This disclosure contemplates a manway relief for a cryogenic rail car that offers several benefits over conventional systems. Instead of using multiple four-inch to six-inch diameter vacuum release nozzles/plates, this disclosure contemplates the use of a large (e.g., sixteen inches or larger in diameter) manway relief nozzle extending through the outer tank at a location directly above the inner manway of the inner tank, and a vacuum release plate held in place over the manway relief nozzle by the differential pressure created between the external environment and the annular space between the inner and outer tanks by the presence of a vacuum within the annular space. As with smaller vacuum release plates, a loss of vacuum in the annular space between the inner and outer tanks causes the release plate to fall off the manway relief nozzle, preventing a build-up of pressure in the annular space. Additionally, the plate may easily be removed, by releasing the vacuum, thereby providing direct access to the inner manway of the inner tank.

Embodiments of the present disclosure and its advantages are best understood by referring to FIGS. 1 through 4 of the drawings, like numerals being used for like and corresponding parts of the various drawings. Additional information is disclosed in U.S. patent application Ser. No. 17/150,198 entitled, "Internal Nozzle for a Tank Car"; and U.S. patent application Ser. No. 17/150,277 entitled, "Welded Nozzle for a Tank Car", which are both hereby incorporated by reference herein as if reproduced in their entirety. A railroad tank car is used throughout this disclosure as an example, but the ideas presented herein may apply to other cryogenic liquid storage tanks, including storage tanks for use on other types of vehicles or vessels.

FIG. 1 illustrates an example cryogenic tank car 100. Cryogenic tank car 100 includes storage tank 102 mounted on wheel assemblies 135 and 140. Storage tank 102 is generally configured to store a cryogenic liquid, such as methane, nitrogen, hydrogen, oxygen, and/or any other liquefied gas. Storage tank 102 includes a generally elongated hollow cylinder, enclosed at a first end by tank head 110 and at a second end by tank head 115. This disclosure contemplates that storage tank 102 may be of any suitable diameter and length.

Storage tank 102 may include piping circuits to load/unload commodity into/out of storage tank 102. For example, storage tank 102 may include a spray header, a sparger, a vent circuit, a fill and drain circuit, any other piping circuit, any other suitable component, and/or any number and combination of the preceding. Valves and/or fittings may be mounted on storage tank 102, to control the loading and unloading of commodities to and from storage tank 102. Such valves and/or fittings may be mounted at any location on storage tank 102. As an example, in certain embodiments, the valves and/or fittings may be mounted on a side of storage tank 102 and housed inside cabinet 130. As another example, in certain embodiments, the valves and/or fittings may be mounted on one or both of tank heads 110 and 115. As a further example, in some embodiments, the valves and/or fittings may be mounted on the top of and/or the bottom of storage tank 102.

As illustrated in FIG. 1, storage tank 102 may be a dual-walled cryogenic tank equipped with a vacuum jacket. For example, storage tank 102 may include outer tank 105 and inner tank 120 positioned within outer tank 105. Outer tank 105 and inner tank 120 may be formed from any suitable material or combination of materials. For example, outer tank 105 and inner tank 120 may be formed from steel, or any other suitable metal. In some embodiments, outer tank 105 may be formed from a different material than inner tank 120. In certain embodiments, the thickness of outer tank 105 is greater than the thickness of inner tank 120.

The exterior surface of inner tank 120 and the interior surface of outer tank 105 define annular space 125. Annular space 125 may be configured to hold a vacuum. For example, annular space 125 may be sealed off from the exterior of outer tank 105 and the interior of inner tank 120, such that air from the exterior of outer tank 105 and/or fluid from the interior of inner tank 120 may not enter annular space 125. A vacuum may be established in annular space 125 using one or more vacuum pumps, or by any other suitable means. Once the vacuum is established, it may be used to provide insulation to the contents of inner tank 120, by minimizing the transfer of heat from outer tank 105 to inner tank 120.

As described above, in regular operating conditions, storage tank 102 is configured to hold a vacuum in annular space 125 between inner tank 120 and outer tank 105. However, if a tank failure occurs which causes the vacuum between inner tank 120 and outer tank 105 to be lost, pressure may build in annular space 125. For example, pressure may build in annular space 125 when tank car 100 descends from a high-altitude location to a lower altitude location. If left unchecked, this pressure, applied to inner tank 120, may cause inner tank 120 to collapse. This is particularly true in embodiments of tank car 100 in which inner tank 120 is constructed from a thin material.

FIGS. 2A and 2B illustrate examples of conventional vacuum release assemblies 210 for use on cryogenic tank car 100. Vacuum release assemblies 210 typically range in size from four to six inches in diameter and are designed to prevent a build-up of pressure in annular space 125 (and accordingly to help prevent inner tank 120 from collapsing as a result of pressure exerted on the external surface of inner tank 120). Federal Regulations mandate the use of such assemblies. 49 CFR 179.400-20(d). As illustrated in FIG. 2A, typical cryogenic tank cars 100 may include multiple vacuum release assemblies 210. The use of multiple small-diameter vacuum release assemblies 210, as opposed to one larger vacuum release assembly, enables the use of a common set of vacuum release parts for both small and large tanks. For example, small tanks may only use one vacuum release assembly 210, while larger tanks may use three vacuum release assemblies 210. Vacuum release assemblies 210 are typically mounted near the top of tank heads 110 and/or 115, or on the top of outer tank 105, down the longitudinal centerline of the tank car 100.

FIG. 2B illustrates a cross-section of a conventional vacuum release assembly 210. Vacuum release assembly 210 includes cover plate 220 and nozzle 215. Nozzle 215 defines a hole in outer tank 105. Nozzle 215 may be formed from a cylindrical pipe and extends from outer tank 105 in a direction generally opposite the direction from outer tank 105 towards inner tank 120. The outer edge of nozzle 215 may include a machine groove, configured to hold O-ring 225. Cover plate 220 may include a similar machine groove, around the edge of the inner surface of the cover plate, such that when cover plate 220 is placed on top of nozzle 215, O-ring 225 couples cover plate 220 to nozzle 215.

Once cover plate 220 is placed on top of nozzle 215, vacuum may be applied to annular space 125. Such a vacuum leads to a differential pressure between the external environment and annular space 125, thereby generating a vacuum pressure on cover 220. This vacuum pressure holds cover plate 220 in place over nozzle 215. O-ring 225, positioned between cover plate 220 and nozzle 215, provides a seal between cover plate 220 and nozzle 215, helping to ensure that vacuum is not lost through the coupling between cover plate 220 and nozzle 215. In certain embodiments, to further help ensure a good seal, vacuum grease may be applied to O-ring 225. While vacuum is maintained within annular space 125, the resulting vacuum pressure may hold cover plate 220 securely in place over nozzle 215. However, in response to a removal of the vacuum (either purposefully, as a result of a tank failure, or for any other reason), cover plate 220 may fall off of nozzle 215 and/or allow any pressure generated within annular space 125 to vent through nozzle 215. In this manner, vacuum release assembly 210 may help to prevent a build-up of pressure within annular space 125. In order to prevent a physical loss of cover plate 220, in response to such a loss of vacuum in annular space 125, cover plate 220 may be secured to tank car 100 using a retention device 230, such as a chain. For example, a first end of chain 230 may be welded to the inside of nozzle 215, and a second end of chain 230 may be welded to the bottom side of cover plate 220, thereby preventing cover plate 220 from falling off of tank car 100 in response to a loss of vacuum within annular space 125.

In a conventional cryogenic tank car 100, vacuum release assemblies 210 may provide the only direct access to annular space 125 between inner tank 120 and outer tank 105. However, due to the small size of nozzles 215, such access is of limited use. For example, if railway employees wish to service the inside of inner tank 120, they must first cut out a large enough hole in outer tank 105 through which they may then access the inner manway of inner tank 120. Accordingly, this disclosure contemplates an unconventional vacuum relief assembly for use in cryogenic tank car 100, which may double as an inner manway access point.

FIG. 3 presents an example embodiment of the unconventional manway relief 300 of the present disclosure. In particular, FIG. 3 presents a cross-section of manway relief 300. Manway relief 300 includes outer nozzle 315, O-rings 320a and 320b, alignment pins 345, and manway relief plate 325. Outer nozzle 315 may include a hollow pipe protruding from outer tank 105 in a direction generally opposite to a direction from outer tank 105 towards inner tank 120, such that a first edge of nozzle 315 is coupled to outer tank 105 and a second edge of nozzle 315 is located a distance d from an external surface of outer tank 105. This disclosure contemplates that distance d may be any suitable distance. In certain embodiments, the first edge of nozzle 315 may be flush with first tank 105, such that the first edge does not extend into annular space 125. In some embodiments, the first edge of nozzle 315 may extend somewhat into annular space 125. As illustrated in FIG. 3, the first edge of outer nozzle 315 defines an opening 330 in outer tank 105 of cryogenic tank car 100. A cross-section of nozzle 315 (and accordingly the shape of opening 330) may be circular, elliptical, or of any other suitable geometry. This disclosure contemplates that nozzle 315 is larger than the nozzles 215 of conventional vacuum release assemblies 210. For example, nozzle 315 may have a diameter of sixteen inches or more, as compared to diameters of four to six inches, typical of conventional vacuum release nozzles 215. In certain embodiments, nozzle 315 may be a manway, providing railway employees access to inner tank 120.

In certain embodiments, the second edge of nozzle 315 may include a lip 335 that is coupled to the outer circumference of the second edge of the pipe used to form nozzle 315 and extends in a generally perpendicular direction away from the center of nozzle 315. Lip 335 may be configured to hold one or more O-rings 320a and 320b. For example, in certain embodiments, lip 335 may include one or more machine grooves configured to hold O-rings 320a and 320b. In some embodiments, the thickness of the pipe that forms nozzle 315 may be such that one or more O-rings 320a and 320b may rest on the second edge of the pipe that forms nozzle 315. In such embodiments, the second edge of the pipe that forms nozzle 315 may include one or more machine grooves configured to hold O-rings 320a and 320b. As illustrated in FIG. 3, O-rings 320a and 320b may be of different diameters. For example, O-ring 320a may have a larger diameter than O-ring 320b, such that O-ring 320b is nested within O-ring 320a.

Manway relief plate 325 is configured to rest on top of O-rings 320a and 320b and to cover opening 330 into outer tank 105. In embodiments in which lip 335 is configured to hold O-rings 320a and 320b, the shape of manway relief plate 325 may be such that manway relief plate 325 covers both opening 330 and lip 335. For example, if opening 330 is generally circular in shape, with a radius r, manway relief plate 325 may also be generally circular in shape, with a radius r+ the perpendicular extent of lip 335 from the second edge of the pipe that forms nozzle 315. In embodiments in which the second edge of the pipe that forms nozzle 315 is configured to hold O-rings 320a and 320b, the shape of manway relief plate 325 may be such that manway relief plate 325 covers opening 330. For example, if opening 330 is generally circular in shape, with a radius r, manway relief plate 325 may also be generally circular in shape, with a radius r.

In certain embodiments, manway relief plate 325 may include one or more machine grooves on the bottom of the plate (the side of plate 325 facing towards outer tank 105 when manway relief plate 325 is positioned on top of nozzle 315), around the outer edge of the plate. Such machine grooves may be configured to accommodate O-rings 320a and 320b, when manway relief plate 325 is placed on top of nozzle 315. In certain embodiments, vacuum grease may be included on O-rings 320a/320b, the machine grooves on nozzle 315, the machine grooves on lip 335, and/or the machine grooves on manway relief plate 325, to help ensure a good seal between manway relief plate 325 and nozzle 315, when vacuum is applied to annular space 125 between outer tank 105 and inner tank 120.

This disclosure contemplates that manway relief plate 325 and nozzle 315 may be formed from any suitable material or materials. For example, in certain embodiments, manway relief plate 325 and/or nozzle 315 are formed from the same material as outer tank 105. In some embodiments, manway relief plate 325 and/or nozzle 315 may be formed from a metal, such as steel, or any other suitable metal. Manway relief plate 325 and nozzle 315 may be formed from the same or different materials.

This disclosure contemplates that when a vacuum is applied to annular space 125, the resulting difference in pressure between the environment outside of outer tank 105 and the environment within annular space 125 is sufficient to hold manway relief plate 325 in place over nozzle 315. The presence of O-rings 320a and 320b, and/or vacuum grease then helps to provide a seal between manway relief plate 325 and nozzle 315, thereby helping to prevent any air from outside of outer tank 105 from entering annular space 125. In certain embodiments, the larger surface area of manway relief plate 325, as compared with conventional vacuum release plates 220, provides a greater clamping force per inch of O-ring 320a/b, thereby providing a better seal for the vacuum within annular space 125. For example, the differential pressure resulting from a vacuum applied to annular space 125 may hold conventional vacuum release plates 220 in place on nozzles 215 with ~200 pounds of force. On the other hand, such a pressure differential may hold manway relief plate 325 in place on nozzle 315 with ~5000 pounds of force.

This disclosure contemplates that manway relief 300 may include any number of one or more O-rings 320a/b positioned on the second edge of nozzle 315. For example, in certain embodiments (and as illustrated in FIG. 3), manway relief 300 may include two O-rings 320a and 320b. The use of multiple O-rings 320a and 320b may be desirable to help ensure that a proper seal is maintained between manway relief plate 325 and nozzle 315. For example, as illustrated in FIG. 3, outer O-ring 320a is exposed to the elements. Accordingly, it may fail as a result of weathering. In contrast, because inner O-ring 320b is protected from the elements by outer O-ring 320a, it is unlikely that inner O-ring 320b will fail at/around the same time as outer O-ring 320a. Accordingly, inner O-ring 320b may act to maintain the seal between manway relief plate 325 and nozzle 315, even when weathering has caused outer O-ring 320a to fail.

As illustrated in FIG. 3, in certain embodiments one or more alignment pins 345 may be used to secure manway relief plate 325 to nozzle 315. When manway relief plate 325 is positioned on top of nozzle 315, each alignment pin 345 extends through all or a portion of the thickness of manway relief plate 325 and through all or a portion of the thickness of lip 335 of nozzle 315. In certain embodiments, for each alignment pin 345, manway relief plate 325 includes a machined hole that is configured to engage an upper portion of the alignment pin. Similarly, lip 335 includes a machined hole that is configured to engage a lower portion of the alignment pin. The use of alignment pins 345 may be desirable to help prevent manway relief plate 325 from sliding on top of nozzle 315 when tank car 100 is in motion.

When vacuum is removed from annular space 125 (either purposefully, as a result of a tank failure, or for any other reason), the pressure differential between the external environment and annular space 125 generated by the vacuum may no longer exist to hold manway relief plate 325 in place over nozzle 315. Accordingly, manway relief plate 325 may fall off of nozzle 315 and/or allow any pressure generated within annular space 125 to vent through nozzle 315. In this manner, manway relief plate 325 may help prevent a build-up of pressure within annular space 125, thereby helping to prevent a collapse of inner tank 120.

In order to prevent a physical loss of manway relief plate 325, in response to a loss of vacuum in annular space 125, manway relief plate 325 may be secured to tank car 100 using a retention device. For example, a first end of chain 340 may be welded to the inside of nozzle 315 and a second end of chain 340 may be welded to the bottom side of manway cover plate 325, thereby preventing manway cover plate 325 from falling off of tank car 100 in response to a loss of vacuum within annular space 125. As another example, manway relief plate 325 may be coupled to nozzle 315 through a hinge or other suitable restraint device.

In certain embodiments, a single manway relief 300 may be provided on tank car 100. Given the larger size of manway relief 300 as compared with conventional vacuum release assemblies 210, in certain embodiments, manway relief 300 may allow for a greater amount of excess pressure in annular space 125 to vent through nozzle 315, as compared with conventional vacuum release assemblies 210, despite the fact that multiple vacuum release assemblies 210 are typically mounted on conventional cryogenic tank cars 100, as opposed to the single manway relief 300 contemplated by the present disclosure.

In certain embodiments, rather than relying on vacuum pressure to hold manway relief plate 325 on nozzle 315, manway relief plate 325 may be welded to the second edge of nozzle 315. In such embodiments, in order to prevent a build-up of pressure within annular space 125, one or more burst discs may be included on outer tank 105 and/or manway relief plate 325. Such burst discs may be formed as thin metal discs that are configured to burst in response to experiencing a build up of pressure. The use of burst discs may be desirable to help maintain the vacuum within annular space 125 in the event of a fire; burst discs are likely to survive longer in a fire than gaskets 320a/b, which will likely melt.

As illustrated in FIG. 3, in addition to functioning as a vacuum relief assembly, manway relief 300 may double as a manway for providing access to inner tank 120. For example, nozzle 315 may be located directly above inner manway 310 of inner tank 120. This disclosure contemplates that inner manway 310 of inner tank 120 is a conventional inner manway typically present in a double-walled cryogenic tank car 100. As illustrated in FIG. 3, inner manway 310 defines an opening into inner tank 120. Inner manway 310 may be formed from a cylindrical pipe and extend from the surface of inner tank 120 in a direction generally towards the interior of inner tank 120. An inner manway cover 305 is typically coupled to inner manway 310. Manway cover 305 typically covers the opening provided by inner manway 310 to the interior of inner tank 120 and may be coupled to inner manway 310 in any suitable manner. As an example, manway cover 305 may be welded to inner manway 310. This disclosure contemplates that manway cover 305 is configured to retain pressure within inner tank 120.

In conventional cryogenic tank cars 100, there is no direct way to access inner manway 310, other than cutting through outer tank 105. This necessarily results in a loss of vacuum within annular space 125. Accordingly, this disclosure contemplates that by positioning manway relief 300 on outer tank 105, at a location directly above inner manway 310 of inner tank 120, a railway employee may access inner manway 310 simply be releasing the vacuum from annular space 125 and removing manway relief plate 325 from nozzle 315. Thus, manway relief 300 may be used to access inner manway 310 without cutting outer tank 105. Once manway relief plate 325 is removed, a railway employee may access the interior of inner tank 120, through manway 310, simply by cutting out inner manway cover 305.

Figure 4:
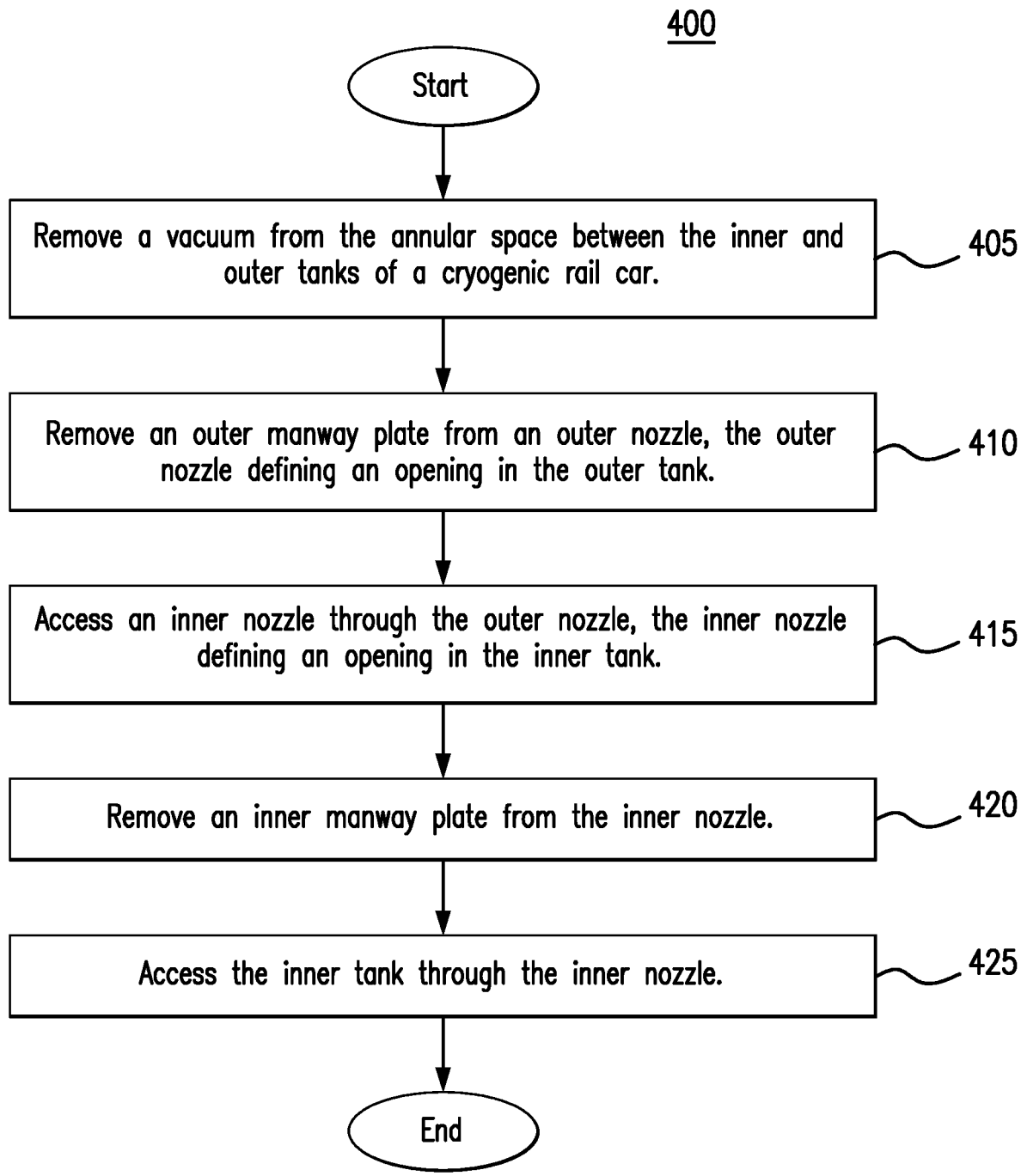
FIG. 4 presents a flow chart illustrating an example method by which the manway relief of FIG. 3 may be used to service the inner tank of the cryogenic tank car of FIG. 1.

FIG. 4 presents a flow chart illustrating an example method 400 by which manway relief 300 of FIG. 3 may be used to service inner tank 120 of cryogenic tank car 100. In step 405, a railway employee releases the vacuum from annular space 125 between inner tank 120 and outer tank 105. Releasing the vacuum removes the force acting to hold manway relief plate 325 in place on nozzle 315. In step 410, the employee removes manway relief plate 325 from nozzle 315, thereby providing the employee with direct access to inner tank 120. In step 415, the employee accesses inner manway 310 and inner manway cover 305 through outer nozzle 315. In step 420, the employee removes inner manway cover 305 from inner manway 310. For example, the employee may cut inner manway cover 305 out from inner manway 310. In step 425, the employee accesses the interior of inner tank 120 through inner manway 310, to service inner tank 120.

Modifications, additions, or omissions may be made to method 400 depicted in FIG. 4. Method 400 may include more, fewer, or other steps. For example, steps may be performed in parallel or in any suitable order. While discussed in terms of an employee performing the steps of method 400, this disclosure contemplates that any suitable person and/or machine may perform the steps of method 400.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A tank for a cryogenic tank car comprising:
   an outer tank;
   an inner tank positioned within the outer tank;
   an inner nozzle defining an opening in the inner tank;
   an inner manway plate covering the opening in the inner tank, the inner manway plate welded to the inner nozzle;
   an outer nozzle defining an opening in the outer tank, the outer nozzle positioned above the inner nozzle, such that the inner manway plate is accessible through the outer nozzle, the outer nozzle extending away from the outer tank and terminating at an upper edge of the outer nozzle; and
   an outer manway plate configured to couple to the upper edge of the outer nozzle to cover the opening in the outer tank, wherein:
      a space defined by an interior surface of the outer tank and an exterior surface of the inner tank is configured to hold a vacuum; and
      in response to applying the vacuum to the space, a differential pressure between the space defined by the interior surface of the outer tank and the exterior surface of the inner tank and a space external to the outer tank secures the outer manway plate to the outer nozzle.

2. The tank of claim 1, wherein:
   the upper edge of the outer nozzle is configured to hold a first gasket; and
   the first gasket is configured to provide a seal between the outer nozzle and the outer manway plate.

3. The tank of claim 2, wherein:
   the upper edge of the outer nozzle comprises a lip extending in a generally perpendicular direction away from an interior of the outer nozzle; and
   the lip is configured to:
      hold the first gasket positioned at a first distance from a center of the outer nozzle; and
      hold a second gasket positioned at a second distance from the center of the outer nozzle, the second distance greater than the first distance.

4. The tank of claim 3, wherein:
   the first gasket comprises a first O-ring of a first diameter; and
   the second gasket comprises a second O-ring of a second diameter greater than the first diameter.

5. The tank of claim 1, wherein:
   the upper edge of the outer nozzle comprises a lip extending in a generally perpendicular direction away from an interior of the outer nozzle;
   the lip comprises a first hole configured to engage a lower portion of an alignment pin;
   the outer manway plate comprises a second hole configured to engage an upper portion of the alignment pin, the alignment pin configured to engage both the first hole and the second hole to secure the outer manway plate to the lip.

6. The tank of claim 1, further comprising a retention device, the retention device comprising a first end coupled to the outer nozzle and a second end coupled to the outer manway plate.

7. The tank of claim 1, wherein:
   the outer manway plate is welded to the upper edge of the outer nozzle; and
   the tank further comprises a burst disc configured to rupture in response to a buildup of positive pressure within the space defined by the interior surface of the outer tank and the exterior surface of the inner tank.

8. A method of servicing an inner tank of a cryogenic tank car comprising an outer tank and the inner tank positioned within the outer tank, the method comprising:
   removing a vacuum from a first space defined by an interior surface of the outer tank and an exterior surface of the inner tank, wherein:

an outer manway plate was secured to an outer nozzle by a differential pressure that was generated by the vacuum between the first space and a space external to the outer tank, wherein the outer nozzle defines an opening in the outer tank, the outer nozzle extending away from the outer tank and terminating at an upper edge of the outer nozzle:
in response to removing the vacuum:
removing the outer manway plate from the outer nozzle, wherein:
the outer nozzle is positioned above an inner nozzle, the inner nozzle defining an opening in the inner tank; and
an inner manway plate is coupled to the inner nozzle, such that the inner manway plate covers the opening in the inner tank:
accessing the inner manway plate through the outer nozzle;
removing the inner manway plate from the inner nozzle; and
accessing the inner tank through the inner nozzle.

9. The method of claim 8, wherein removing the inner manway plate from the inner nozzle comprises cutting the inner manway plate out of the inner nozzle.

10. The method of claim 8, wherein a gasket is positioned between the upper edge of the outer nozzle and the outer manway plate, the gasket configured to provide a seal between the outer nozzle and the outer manway plate.

11. The method of claim 8, wherein:
the upper edge of the outer nozzle comprises a lip extending in a generally perpendicular direction away from an interior of the outer nozzle; and
the lip is configured to:
hold the first gasket positioned at a first distance from a center of the outer nozzle; and
hold a second gasket positioned at a second distance from the center of the outer nozzle, the second distance greater than the first distance.

12. The method of claim 11, wherein:
the first gasket comprises a first O-ring of a first diameter; and
the second gasket comprises a second O-ring of a second diameter greater than the first diameter.

13. The method of claim 8, wherein:
the upper edge of the outer nozzle comprises a lip extending in a generally perpendicular direction away from an interior of the outer nozzle;
the lip comprises a first hole configured to engage a lower portion of an alignment pin;
the outer manway plate comprises a second hole configured to engage an upper portion of the alignment pin, the alignment pin configured to engage both the first hole and the second hole to secure the outer manway plate to the lip; and
removing the outer manway plate from the outer nozzle comprises at least one of:
disengaging the alignment pin from the first hole; and
disengaging the alignment pin from the second hole.

14. The method of claim 8, wherein a first end of a retention device is coupled to the outer nozzle and a second end of the retention device is coupled to the outer manway plate, the method further comprising, in response to removing the vacuum, removing the retention device from the outer manway plate.

15. A cryogenic tank car comprising:
an outer tank;
an inner tank positioned within the outer tank;
an inner nozzle defining an opening in the inner tank:
an inner manway plate covering the opening in the inner tank, the inner manway plate welded to the inner nozzle:
an outer nozzle defining an opening in the outer tank, the outer nozzle positioned above the inner nozzle, such that the inner manway plate is accessible through the outer nozzle, the outer nozzle extending away from the outer tank and terminating at an upper edge of the outer nozzle:
an outer manway plate coupled to the upper edge of the outer nozzle, such that the outer manway plate covers the opening in the outer tank, wherein:
a space defined by an interior surface of the outer tank and an exterior surface of the inner tank is configured to hold a vacuum; and
in response to applying the vacuum to the space, a differential pressure between the space defined by the interior surface of the outer tank and the exterior surface of the inner tank and a space external to the outer tank secures the outer manway plate to the outer nozzle; and
a set of wheel assemblies, wherein the outer tank is coupled to the set of wheel assemblies.

16. The cryogenic tank car of claim 15, wherein:
the upper edge of the outer nozzle is configured to hold a first gasket; and
the first gasket is configured to provide a seal between the outer nozzle and the outer manway plate.

17. The cryogenic tank car of claim 16, wherein:
the upper edge of the outer nozzle comprises a lip extending in a generally perpendicular direction away from an interior of the outer nozzle; and
the lip is configured to:
hold the first gasket positioned at a first distance from a center of the outer nozzle; and
hold a second gasket positioned at a second distance from the center of the outer nozzle, the second distance greater than the first distance.

18. The cryogenic tank car of claim 17, wherein:
the first gasket comprises a first O-ring of a first diameter; and
the second gasket comprises a second O-ring of a second diameter greater than the first diameter.

19. The cryogenic tank car of claim 18, wherein:
the upper edge of the outer nozzle comprises a lip extending in a generally perpendicular direction away from an interior of the outer nozzle;
the lip comprises a first hole configured to engage a lower portion of an alignment pin;
the outer manway plate comprises a second hole configured to engage an upper portion of the alignment pin, the alignment pin configured to engage both the first hole and the second hole to secure the outer manway plate to the lip.

20. The cryogenic tank car of claim 15, wherein:
the outer manway plate is welded to the upper edge of the outer nozzle; and
the cryogenic tank car further comprises a burst disc configured to rupture in response to a buildup of positive pressure within the space defined by the interior surface of the outer tank and the exterior surface of the inner tank.

* * * * *